US007412079B2

(12) United States Patent
Fukushima

(10) Patent No.: US 7,412,079 B2

(45) Date of Patent: Aug. 12, 2008

(54) IMAGE PROCESSING APPARATUS

(75) Inventor: Nobuo Fukushima, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 738 days.

(21) Appl. No.: 10/981,038

(22) Filed: Nov. 3, 2004

(65) Prior Publication Data

US 2005/0135686 A1 Jun. 23, 2005

(30) Foreign Application Priority Data

Dec. 22, 2003 (JP) ............................ 2003-424743

(51) Int. Cl.
*G06K 9/00* (2006.01)

(52) U.S. Cl. ..................................................... 382/107

(58) Field of Classification Search ................. 382/232, 382/236, 238, 243; 348/394.1, 407.1, 400.1–402.1, 348/409.1–416.1, 430.1–431.1; 375/240.1, 375/240.12–240.17; 386/111
See application file for complete search history.

(56) References Cited

U.S. PATENT DOCUMENTS 4,969,039 A * 11/1990 Koga et al. .................. 386/111
5,691,767 A * 11/1997 Tahara ................... 375/240.01
5,802,211 A * 9/1998 King .......................... 382/236
5,847,767 A * 12/1998 Ueda ....................... 348/423.1
5,988,863 A * 11/1999 Demos ....................... 708/203
6,512,793 B1 * 1/2003 Maeda .................. 375/240.08
6,954,544 B2 * 10/2005 Jepson et al. ............... 382/107
7,257,265 B2 * 8/2007 Itokawa ...................... 382/243

FOREIGN PATENT DOCUMENTS

JP 2000-197003 A1 7/2000

* cited by examiner

*Primary Examiner*—Jose L Couso
(74) *Attorney, Agent, or Firm*—Canon U.S.A. Inc., I.P. Division

(57) ABSTRACT

An image processing apparatus according to the present invention includes: an input unit for inputting a moving image signal; an extracting unit for extracting a portion of the moving image signal for a plurality of frames input by the input unit; an encoding unit for encoding the portion of the moving image signal extracted by the extracting unit using intraframe coding and interframe predictive coding; and a control unit for detecting motion of an image in an area outside the portion of the moving image signal input by the input unit and for controlling a time for performing encoding using the intraframe coding performed by the encoding unit in accordance with a result of detection of the motion.

8 Claims, 5 Drawing Sheets

IMAGE PROCESSING APPARATUS

BACKGROUND OF THE INVENTION

1. Field of the Invention

The present invention relates to image processing apparatuses, and more particularly, to encoding processing for image signals.

2. Description of the Related Art

Moving picture expert group (MPEG) techniques are known as encoding techniques for image signals and are described, for example, in Japanese Patent Laid-Open No. 2002-199408 and Japanese Patent Laid-Open No. 9-163379.

In MPEG encoding techniques, an image signal is categorized into an I-frame, a P-frame, and a B-frame to be encoded. For I-frames, encoding is performed using an image signal only within the same frame. For P-frames, motion compensation predictive encoding is performed using an image signal of a previous I-frame or P-frame. For B-frames, motion compensation predictive encoding is performed using an image signal of a previous I-frame or P-frame and a subsequent I-frame or P-frame.

For transmitting an MPEG-encoded image signal using a transmission path of a limited transmission rate or for recording an MPEG-encoded image signal in a recording medium, it is preferable that the amount of data (data rate) per unit of time be kept constant. A mode for keeping the data rate constant is called a constant bit rate (CBR) mode.

In MPEG techniques, P-frames and B-frames use image signals of other frames to perform motion compensation predictive encoding. Thus, if there is a large change in a screen, for example, if a new object suddenly appears in a screen of a P-frame, a prediction error is increased.

Also, since the data rate must be kept constant in the CBR mode, if a prediction error is increased due to such a large movement, the width of a quantization step must be increased in order to reduce the amount of data.

Thus, the quality of an image in a portion including a large change is reduced, compared with other frames.

SUMMARY OF THE INVENTION

The present invention prevents a reduction in the quality of an image even when a large change occurs in a screen.

According to an aspect of the present invention, an image processing apparatus includes: an input unit for inputting a moving image signal; an extracting unit for extracting a portion of the moving image signal for a plurality of frames input by the input unit; an encoding unit for encoding the portion of the moving image signal extracted by the extracting unit using intraframe coding and interframe predictive coding; and a control unit for detecting motion of an image in an area outside the portion of the moving image signal input by the input unit and for controlling a time for performing encoding using the intraframe coding performed by the encoding unit in accordance with a result of detection of the motion.

Further features and advantages of the present invention will become apparent from the following description of the embodiments described below with reference to the attached drawings.

DESCRIPTION OF THE EMBODIMENTS

Figure 1:
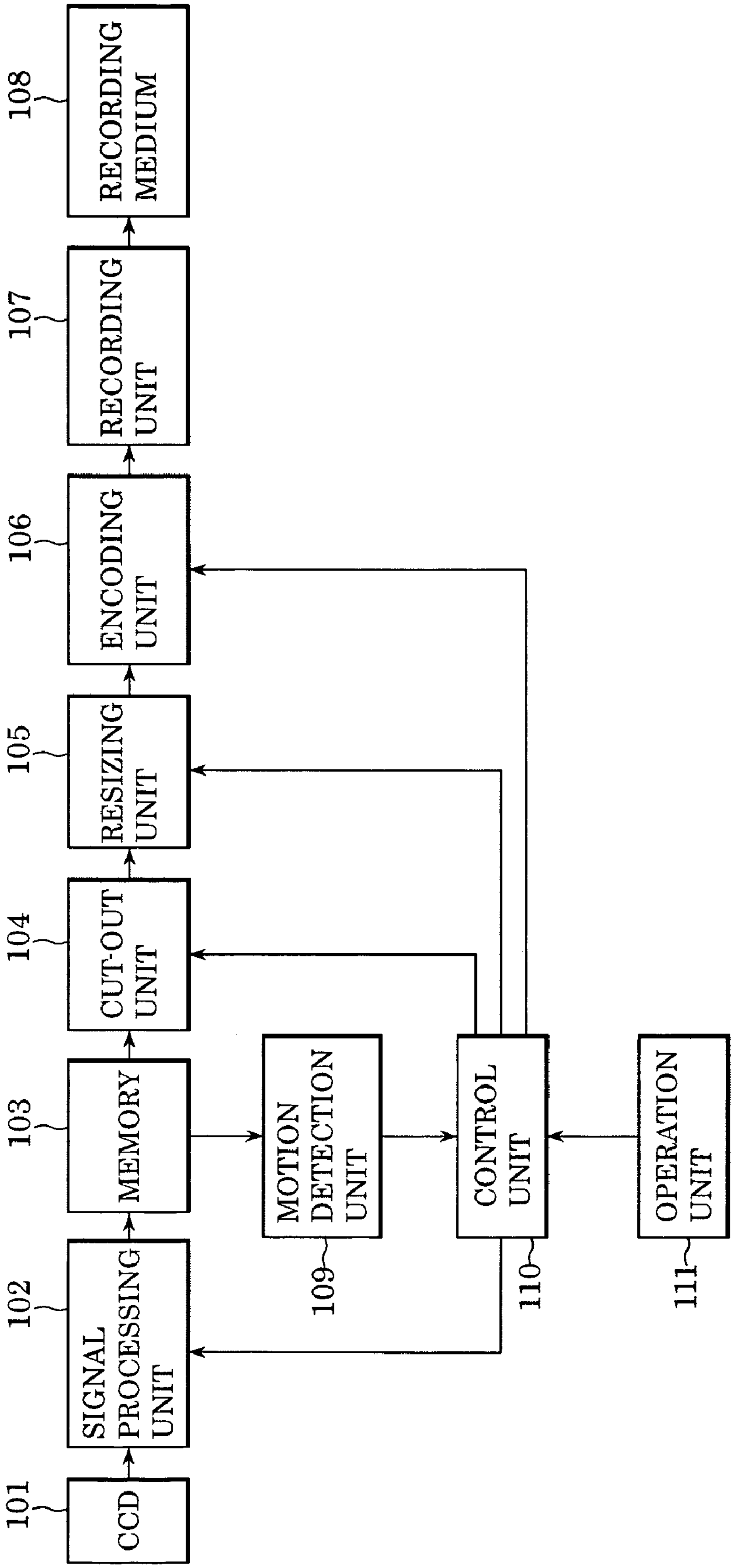
FIG. 1 shows the structure of an image-capturing apparatus according to the present invention.

FIG. 1 is a block diagram showing the structure of an image-capturing apparatus 100 according to an embodiment of the present invention.

The image-capturing apparatus 100 according to this embodiment has a function to photograph static images, in addition to a function to photograph moving images.

A charge-coupled device (CCD) 101 has pixels whose number is suitable for photographing static images.

For example, although about 350,000 pixels including 720+Y (horizontal direction)×480+X (vertical direction), where X and Y represent several pixels necessary for signal processing, is sufficient for obtaining moving images by the normal National Television System Committee (NTSC) system, a CCD having about 2,000,000 pixels including 1,600+Y (horizontal direction)×1,200+X (vertical direction) is provided in this embodiment in order to photograph static images.

A signal processing unit 102 converts an image signal output from the CCD 101 into a digital signal. After performing other necessary processing on the image signal, the signal processing unit 102 outputs the processed image signal to a memory 103. The memory 103 stores the image signal for a plurality of frames output from the signal processing unit 102. A cut-out unit 104 extracts a cut-out area from the image signal stored in the memory 103 in accordance with a photography mode, and outputs the image signal of the cut-out area to a resizing unit 105. The resizing unit 105 reduces the number of pixels of the image signal output from the cut-out unit 104 to the number of pixels suitable for a recording format based on the photography mode, and outputs the processed image signal to an encoding unit 106.

The encoding unit 106 encodes the image signal in the MPEG or joint picture expert group (JPEG) format in accordance with an instruction from a control unit 110, and outputs the encoded image signal to a recording unit 107. The recording unit 107 records encoded image data in a recording medium 108. For example, a disk medium is used as a recording medium in this embodiment.

A motion detection unit 109 detects a motion vector between the cut-out area read by the cut-out unit 104 and other areas from the image signal for a plurality of frames stored in the memory 103, and outputs the motion vector to the control unit 110.

The control unit 110 switches between a photography mode for static images and a photography mode for moving images in accordance with an instruction from an operation unit 111. In the photography mode for moving images, the control unit 110 controls MPEG-encoding processing by the encoding unit 106 in accordance with an output from the motion detection unit 109.

Figure 2:
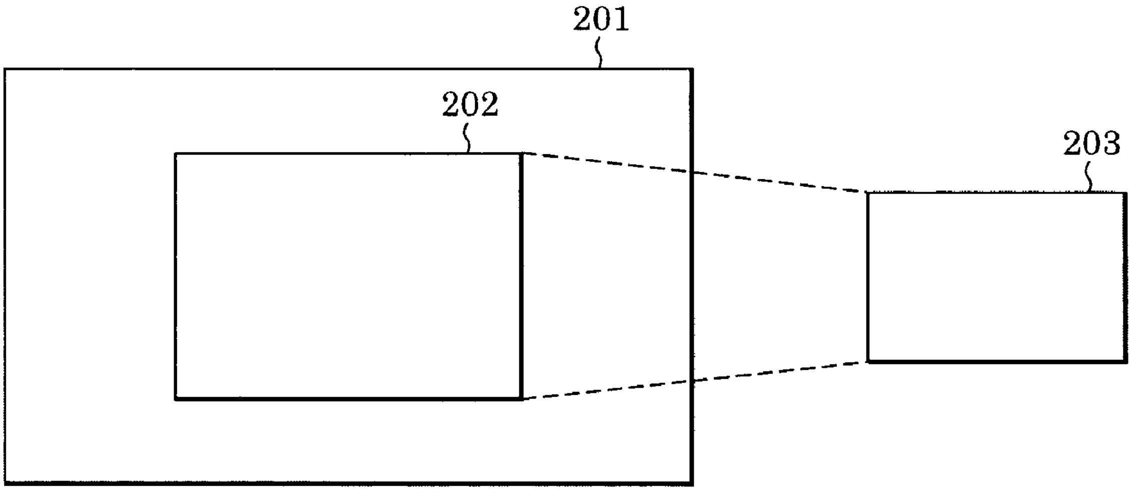
FIG. 2 shows an image used in an embodiment of the present invention.

FIG. 2 shows an image signal used in this embodiment.

Referring to FIG. 2, an image screen 201 read from the CCD 101 is processed by the signal processing unit 102. A cut-out area 202 is extracted by the cut-out unit 104. A resized screen 203 has a size of an image whose size is reduced by the resizing unit 105 in the photography mode for moving images. The size of the resized screen 203 can be desirably set.

According to the image-capturing apparatus, in the photography mode for static images, when a photography instruction is given from the operation unit 111, the control unit 110 controls the signal processing unit 102 to store an image signal for a frame in the memory 103. Also, the control unit 110 controls the cut-out unit 104 and the resizing unit 105 to reduce the size of the image signal stored in the memory 103 to a designated size, and outputs the processed image signal to the encoding unit 106.

In this embodiment, in the photography mode for static images, the size (the number of pixels) of a static image to be photographed can be set to a desired size within the size of the image screen 201 shown in FIG. 2.

The encoding unit 106 JPEG-encodes the image signal output from the resizing unit 105 and outputs the encoded image signal to the recording unit 107. The recording unit 107 records the encoded static image signal in the recording medium 108.

A process performed in the photography mode for moving images will be described.

When an instruction for starting to photograph a moving image is given from the operation unit 111, the control unit 110 controls the signal processing unit 102 to sequentially write the image signal output from the CCD 101 in the memory 103 for each frame. In the photography mode for moving images, the predetermined cut-out area (the number of pixels) 202 of the image signal is extracted from the image screen 201 shown in FIG. 2 stored in the memory 103 by the cut-out unit 104 and output to the resizing unit 105. After sequentially processing the image signal as described above, the processed image signal is output to the encoding unit 106. The encoding unit 106 encodes the processed moving image data, and the recording unit 107 records the encoded moving image data in the recording medium 108. As described above, in the photography mode for moving images, a portion of an image output from the CCD 101 is extracted and recorded.

In the photography mode for moving images, the control unit 110 controls the encoding unit 106 in accordance with an output of detection by the motion detection unit 109.

A control operation by the control unit 110 is described next.

Figure 3A:
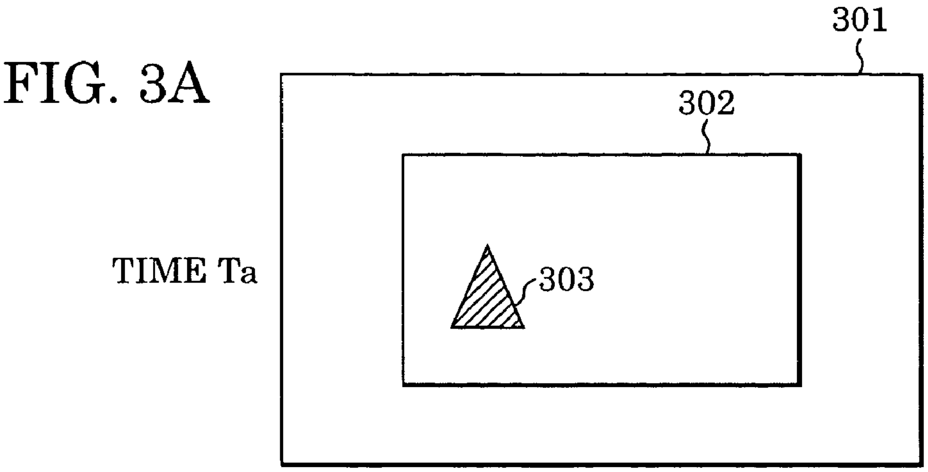
FIGS. 3A to 3C illustrate an operation for detecting a motion in the embodiment.
Figure 3B:
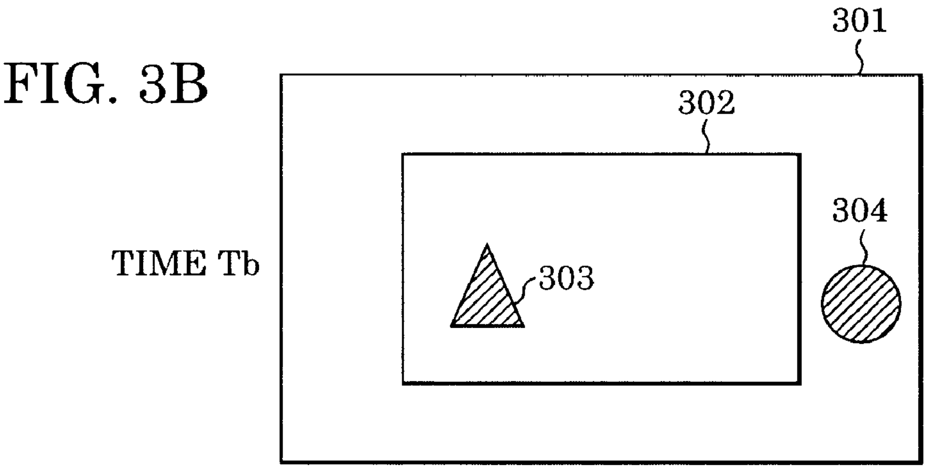
Figure 3C:
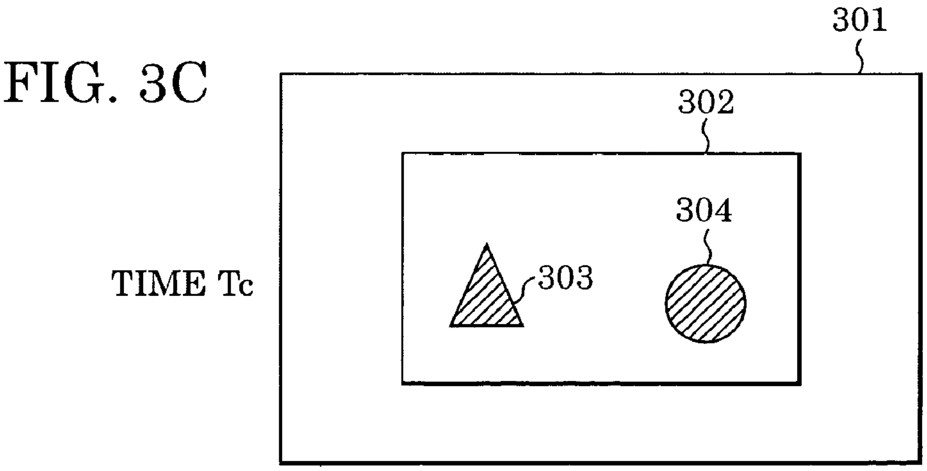

FIGS. 3A to 3C show images in a photograph scene. FIGS. 3A, 3B, and 3C show images at times Ta, Tb, and Tc, respectively.

Referring to FIGS. 3A to 3C, the size of an image screen 301 is equal to the size of an image output from the CCD 101, as in the image screen 201 shown in FIG. 2. Also, a recording area 302 represents an area extracted by the cut-out unit 104 in the photography mode for moving images, as in the cut-out area 202 shown in FIG. 2. Objects 303 and 304 are provided.

At time Ta shown in FIG. 3A, the object 303 exists within the recording area 302. As shown in FIGS. 3B and 3C, the object 304 moves, with the lapse of time from the time Tb to the time Tc, inside the recording area 302 at the time Tc.

Figure 4:
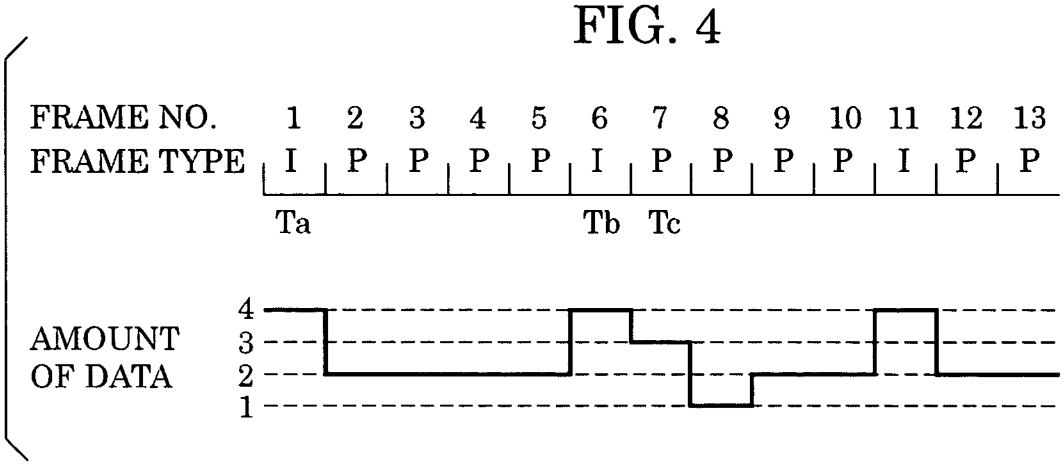
FIG. 4 shows a change in the amount of code.

FIG. 4 shows the amount of data when such a scene as that shown in FIGS. 3A to 3C is MPEG-encoded.

Referring to FIG. 4, I represents an I-frame, and P represents a P-frame. For the sake of simpler explanation, an example in which there is no B-frame is shown. Also, the numbers of frames are added on the axis for a frame number in order to sequentially represent frames.

Here, an I-frame is inserted for every five frames.

The times Ta, Tb, and Tc are shown below the frame type. The amount of data for each frame is relatively shown on the axis of the amount of data. For the sake of simpler explanation, the amount of data is classified into four levels as an approximate value. Here, a larger number represents a larger amount of data.

In the CBR mode, the amount of data is controlled such that the average amount of data is 12/5.

Since frame 1 at the time Ta is an I-frame, which has a large amount of data, the level is 4. Then, since frames 2 to 5 are P-frames, which have relatively small amounts of data, the level is 2.

Since frame 6 at the time Tb is five frames after the previous I-frame, frame 6 is an I-frame and the level of frame 6 is 4.

Although frame 7, which is subsequent to the frame at the time Tb, is a P-frame, since the object 304 moves inside the recording area 302 at the time Tc, a difference between frames 6 and 7 increases. Thus, the level of the amount of data is 3.

The level of the amount of data of frame 8 should be 2 since there is a small difference between frames 7 and 8. However, since the level of frame 7, which is the previous frame, is 3, if the level of frame 8 is set to 2, the average amount of data at a predetermined time exceeds a reference amount. Thus, the level of the amount of data of frame 8 is unavoidably set to 1. Then, the levels of frames 9 and 10 are 2. In frame 11, an I-frame is inserted and the level of the amount of data is 4. Accordingly, the average amount of data from frames 6 to 10 is 12/5.

If encoding is performed as described above, by inserting an I-frame at a predetermined period, when a new object suddenly moves inside a screen, as shown in FIG. 3C, the amount of code is increased and the quality of an image is reduced.

In this embodiment, in the photography mode for moving images, as shown in FIGS. 3B and 3C, a motion of an object outside the recording area 302 is detected, and encoding processing is changed in accordance with a result of detection of the motion.

In other words, the motion detection unit 109 shown in FIG. 1 detects a motion vector of an image outside the recording area 302 from images for two consecutive frames stored in the memory 103, and outputs the result to the control unit 110.

More specifically, in the screen shown in FIG. 3B, a motion vector of the object 304 is detected using an image signal of an immediately preceding screen. In this case, since moving of the object 304 toward the left direction of the screen is detected, information on the position of the object and the detected motion vector are output to the control unit 110.

If, for example, a frame at the time Tb is an I-frame in accordance with an output from the motion detection unit 109, the control unit 110 controls the encoding unit 106 to delay a time for inserting an I-frame and to encode the screen at the time Tb as a P-frame.

Figure 5:
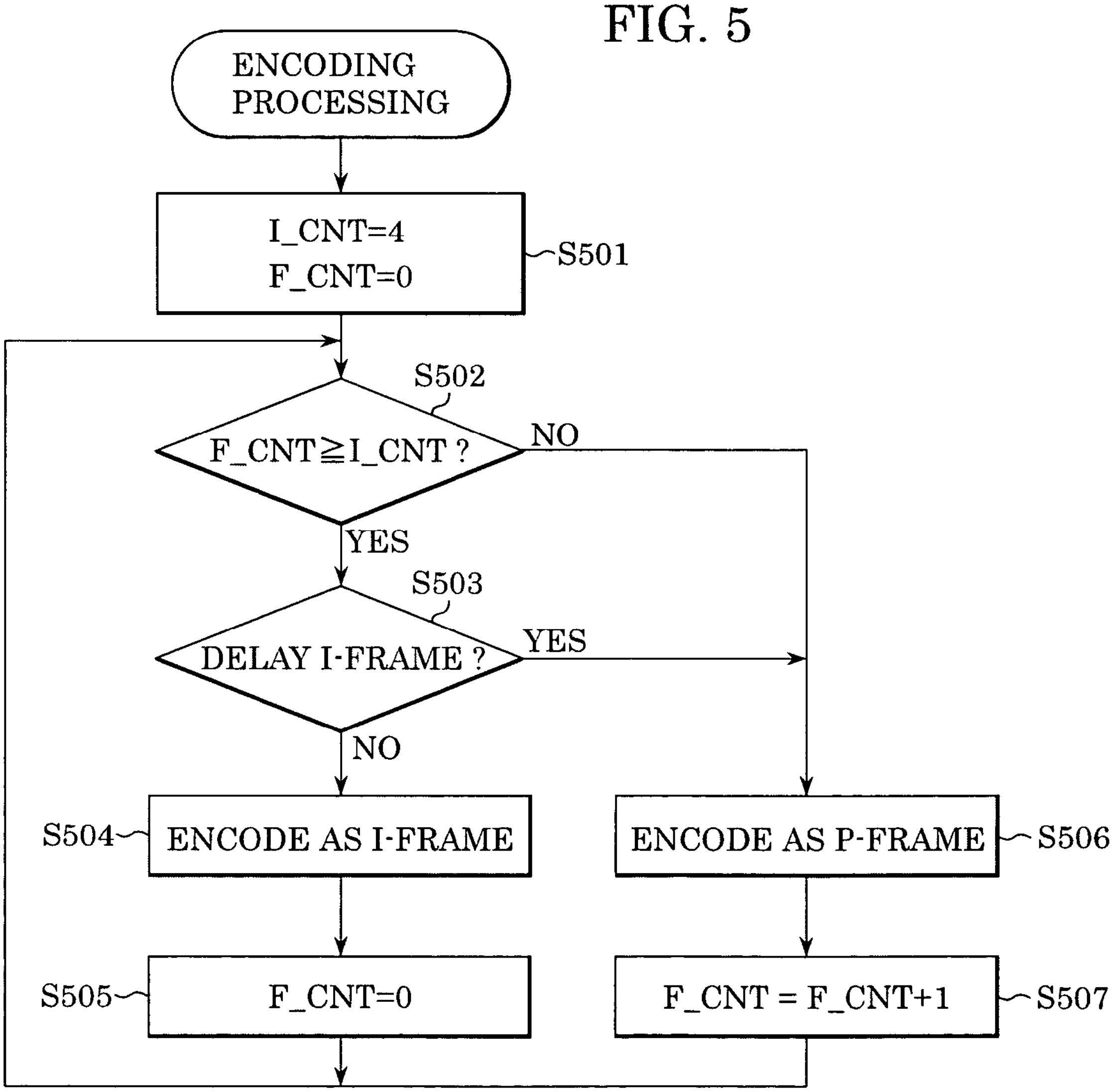
FIG. 5 is a flowchart showing a process for controlling encoding processing in the embodiment.

A process performed by the control unit 110 when encoding processing is performed is described next with reference to the flowchart shown in FIG. 5.

When encoding processing starts, I_CNT, which represents an insertion interval of an I frame, is set to 4, and F_CNT, which represents a variable for counting the number of processed frames, is set to 0 (step S501). In other words, an I-frame is inserted when the number of frames becomes 4 by counting from 0. Then, it is determined whether or not F_CNT is more than or equal to I_CNT (step S502). If F_CNT is more than or equal to I-CNT, that is, if F_CNT is 4 or more, it is determined that an I-frame should be inserted at this timing. In step S503, it is determined whether or not the time for inserting the I-frame should be delayed in accordance with an output from the motion detection unit 109.

The motion detection unit 109 detects a motion vector of an image outside the recording area 302 in the image screen 301 shown in FIGS. 3A to 3C. Under the assumption that objects within a particular macro block move at the same speed, the motion detection unit 109 predicts a time at which the object moves inside the recording area 302.

When the object outside the recording area 302 is predicted to move inside the recording area 302 at a time corresponding to the subsequent frame, a delay signal is output.

When a delay signal is not output from the motion detection unit 109, the control unit 110 controls the encoding unit 106 to encode the frame as an I-frame (step S504), and sets F_CNT to 0 (step S505). Then, the process returns to step S502.

If the delay signal for the I-frame is output from the motion detection unit 109 in step S503, the encoding unit 106 is controlled to encode the frame as a P-frame (step S506), and 1 is added to F_CNT (step S507). Then, the process returns to step S502.

Also, if F_CNT does not reach I-CNT (4) in step S502, it is determined not to be a time for inserting an I-frame, and the frame is encoded as a P-frame(step S506), and 1 is added to F_CNT (step S507). Then, the process returns to step S502.

Figure 6:
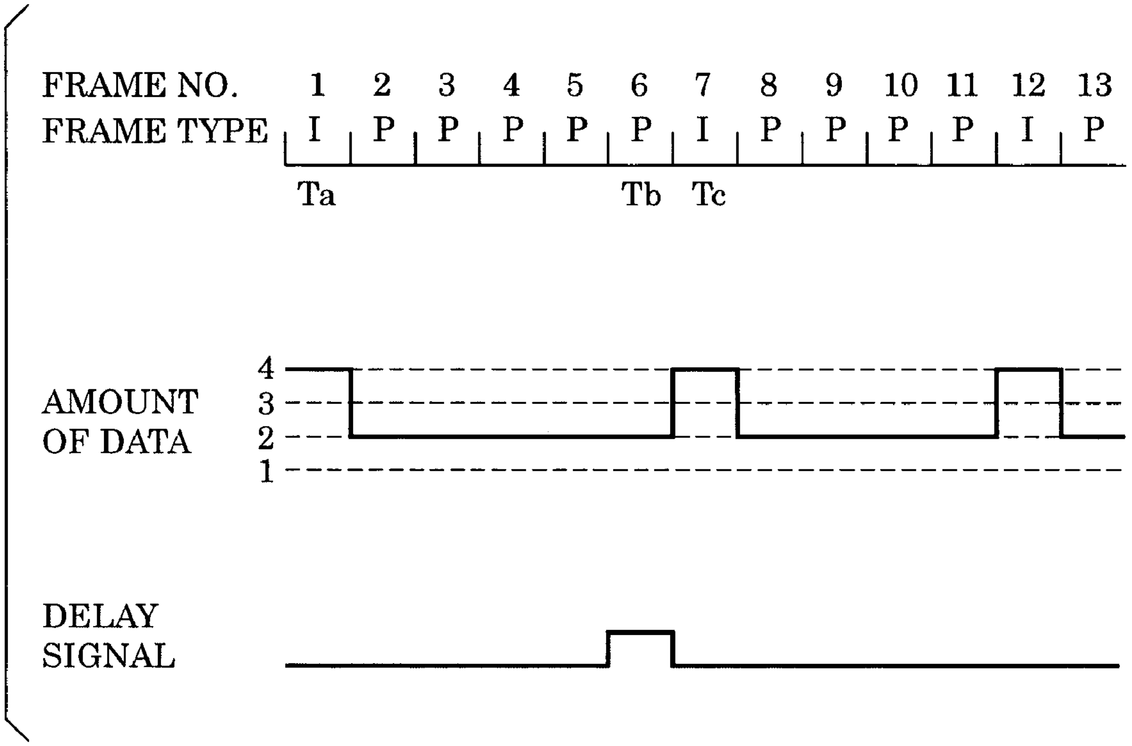
FIG. 6 is an illustration showing a change of the amount of code in the embodiment.

FIG. 6 shows the amount of data when the scene shown in FIGS. 3A to 3C is encoded as described above.

Since frame 1 at the time Ta is an I-frame, which has a large amount of data, the level is 4. Then, since frames 2 to 5 are P-frames, which have relatively small amounts of data, the level is 2.

Although frame 6 at the time Tb should be an I-frame since frame 6 is five frames after the previous I-frame, a detection result by the motion detection unit 109 is reflected here.

Here, the motion detection unit 109 detects a motion in an area outside the recording area 302 of the image signal for a plurality of frames stored in the memory 103. Although the object 304 is located outside the recording area 302 in FIG. 3B, the object 304 is predicted to move inside the recording area 302 at a time corresponding to the subsequent frame.

The motion detection unit 109 outputs a delay signal for delaying insertion of an I-frame to the control unit 110.

The control unit 110 receives the delay signal and controls the encoding unit 106 to delay insertion of the I-frame.

Thus, the encoding unit 106 encodes frame 6 as a P-frame, not as an I-frame. Thus, the level of the amount of data is 2. The object 304 moves inside the screen at the time Tc, and an image difference between frames 6 and 7 increases. However, since the control unit 110 receives the delay signal in advance, the control unit 110 instructs the encoding unit 106 to encode frame 7 as an I-frame. Thus, the level of the amount of data of frame 7 is 4.

The subsequent frames are counted for insertion of an I-frame with reference to frame 7.

In other words, frames 8 to 11 are encoded as P-frames. Since there is a small image difference from the respective previous frame, the amount of data is 2. For frame 12, if there is no image moving into the recording area 302, a delay signal is not output and an I-frame is inserted. Thus, the amount of data is 4.

In this case, each of the average of frames 1 to 5 and the average of frames 7 to 11 is 12/5. However, the average of frames 2 to 6 is 10/5, and this falls below the desired data rate 12/5.

Although this is not strictly defined as CBR, there is no need to increase the amount of data in an area including only a small image change. In other words, a reduction in the amount of data without reducing the image quality does not cause a practical problem.

As described above, according to this embodiment, when part of a photographed image is extracted, encoded as a moving image, and recorded, motion of an object outside a recording area is detected. If it is determined that a new object moves inside the recording area, a time for inserting an I-frame is changed. Thus, a reduction in the image quality due to an increase in a prediction error can be prevented.

Although a case where a moving image signal is photographed and encoded by using a CCD having more pixels for static image photography than for moving image photography is described in the embodiment described above, the present invention is not limited to this. The present invention is also applicable to an image-capturing apparatus provided with a CCD having more pixels than pixels corresponding to a recording area in order to compensate for blurring when a moving image is photographed.

More specifically, in order to compensate for blurring, for example, the cut-out area 202 of an image shown in FIG. 2 is moved based on a motion vector of the entire image. In such an arrangement, movement of an object from an area outside the cut-out area is predicted and a time for inserting an I-frame is changed. Thus, a reduction in the image quality due to an increase in the amount of code can be prevented.

Also, although an I-frame is inserted for every five frames as a rule in the embodiment described above, when insertion of an I-frame is delayed, the delay causes deviation from the rule. Furthermore, the amount of data temporarily falls below the average.

This is insignificant in the embodiment described above, however, inconvenience may occur depending on the system.

In this case, even if insertion of an I-frame is delayed, the next I frame may be controlled to be inserted at an originally scheduled time for insertion.

For example, in FIG. 6, an I-frame should originally be inserted for every five frames: in frame 1, frame 6, and frame 11. In this case, even when insertion of an I-frame in frame 6 is delayed, the next I-frame is inserted in frame 12.

This arrangement can be in conformity with an arrangement in which an I-frame is inserted for every five frames and with a rule of a constant bit rate. This arrangement can be made by changing a control program of the control unit 110.

Also, users can desirably change an area of an image to be extracted in a photography mode for moving images.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-424743 filed Dec. 22, 2003, which is hereby incorporated by reference herein.

What is claimed is:

1. An image processing apparatus comprising:

input means for inputting a moving image signal;

extracting means for extracting a portion of the moving image signal for a plurality of frames input by the input means;

encoding means for encoding the portion of the moving image signal extracted by the extracting means using intraframe coding and interframe predictive coding; and control means for detecting motion of an image in an area outside the portion of the moving image signal input by the input means and for controlling a time for performing encoding using the intraframe coding performed by the encoding means in accordance with a result of detection of the motion, wherein the control means detects that the image in the area outside the portion in a present frame moves inside the portion in a consecutively following frame; and wherein the control means controls the encoding means to encode the image signal in the present frame using the interframe predictive coding and to encode the image signal in the consecutively following frame using the intraframe coding.

2. An image processing apparatus comprising:

input means for inputting a moving image signal;

extracting means for extracting a portion of the moving image signal for a plurality of frames input by the input means;

encoding means for encoding the portion of the moving image signal extracted by the extracting means using intraframe coding and interframe predictive coding; and control means for detecting motion of an image in an area outside the portion of the moving image signal input by the input means and for controlling a time for performing encoding using the intraframe coding performed by the encoding means in accordance with a result of detection of the motion, wherein the encoding means performs encoding using the intraframe coding for every frame at a predetermined frame interval; and wherein even when a respective present frame is to be encoded using the intraframe coding, the control means controls the encoding means to encode the present frame using the interframe predictive coding when the image in the area outside the portion in the respective present frame is detected to move inside the portion in the consecutively following frame.

3. The apparatus according to claim 1, wherein the size of the portion extracted by the extracting means is changeable.

4. An image processing apparatus comprising:

input means for inputting a moving image signal;

extracting means for extracting a portion of the moving image signal for a plurality of frames input by the input means;

encoding means for encoding the portion of the moving image signal extracted by the extracting means using intraframe coding and interframe predictive coding;

control means for detecting motion of an image in an area outside the portion of the moving image signal input by the input means and for controlling a time for performing encoding using the intraframe coding performed by the encoding means in accordance with a result of detection of the motion; and setting means for setting a moving image mode in which the encoding means encodes the moving image signal input by the input means and a still image mode in which one frame of the moving image signal input by the input means is selected and the encoding means encodes the image signal of the selected frame, wherein an area extracted by the extracting means in the still image mode is larger than the portion extracted by the extracting means in the moving image mode.

5. The apparatus according to claim 1, wherein:

the input means includes a memory for storing the moving image signal for the plurality of frames; and the control means detects motion using the moving image signal for the plurality of frames stored in the memory.

6. An image processing apparatus comprising:

input means for inputting a moving image signal;

extracting means for extracting a portion of the moving image signal for a plurality of frames input by the input means;

encoding means for encoding the portion of the moving image signal extracted by the extracting means using intraframe coding and interframe predictive coding; and control means for detecting motion of an image in an area outside the portion of the moving image signal input by the input means and for controlling a time for performing encoding using the intraframe coding performed by the encoding means in accordance with a result of detection of the motion, wherein the input means includes an image-capturing unit for photographing an object and outputting the moving image signal;

wherein the extracting means includes a memory for storing the moving image signal acquired by the image-capturing unit; and wherein blurring of an image according to the moving image signal is compensated for by changing a position of the portion of the moving image signal stored in the memory in accordance with an amount of movement of the image according to the moving image signal.

7. The apparatus according to claim 1, further comprising recording means for recording the portion of the moving image signal encoded by the encoding means into a recording medium.

8. An image processing apparatus comprising:

input means for inputting a moving image signal;

extracting means for extracting a portion of the moving image signal for a plurality of frames input by the input means;

encoding means for encoding the portion of the moving image signal extracted by the extracting means and a still image signal corresponding to one frame of the moving image signal input by the input means;

setting means for setting a moving image mode in which the encoding means encodes the moving image signal extracted by the extracting means and a still image mode in which the encoding means encodes the still image signal; and control means for detecting motion of an image in an area outside the portion of the moving image signal input by the input means and for controlling encoding processing performed by the encoding means in accordance with a result of detection of the motion, wherein an area of the still image signal encoded by the encoding means in the still image mode is larger than the portion extracted by the extracting means in the moving image mode.

* * * * *